United States Patent [19]

Jonner et al.

[11] Patent Number: 5,390,994
[45] Date of Patent: Feb. 21, 1995

[54] HYDRAULIC BRAKE SYSTEM WITH ANTI-LOCK AND DRIVE SLIP CONTROL DEVICE, FOR MOTOR VEHICLES

[75] Inventors: Wolf-Dieter Jonner, Beilstein-Schmidhausen; Wolfgang Bernhardt, Korntal; Helmut Pueschel, Marbach; Guenther Schmidt, Tamm-Hohenstange, all of Germany

[73] Assignee: Robert Bosch GmbH, Stuttgart, Germany

[21] Appl. No.: 157,057

[22] PCT Filed: Jun. 2, 1992

[86] PCT No.: PCT/DE92/00442

§ 371 Date: Dec. 2, 1993

§ 102(e) Date: Dec. 2, 1993

[87] PCT Pub. No.: WO93/00239

PCT Pub. Date: Jan. 7, 1993

[30] Foreign Application Priority Data

Jun. 29, 1991 [DE] Germany ............... 4121604

[51] Int. Cl.6 .......................................... B60T 13/14
[52] U.S. Cl. ........................... 303/113.2; 303/10; 303/116.2
[58] Field of Search ............. 303/10, 11, 113.1, 113.2, 303/116.1, 116.2, 119.1, DIG. 1, DIG. 2; 180/197

[56] References Cited

U.S. PATENT DOCUMENTS

| | | | |
|---|---|---|---|
| 4,900,102 | 2/1990 | Jonner et al. | 303/113.2 X |
| 5,131,730 | 7/1992 | Kollers et al. | 303/116.2 X |
| 5,169,214 | 12/1992 | Holzmann et al. | 303/113.2 |
| 5,188,435 | 2/1993 | Willmann | 303/113.2 |
| 5,188,437 | 2/1993 | Willmann | 303/113.2 |
| 5,207,487 | 5/1993 | Holzmann et al. | 303/113.2 |

Primary Examiner—Robert J. Oberleitner
Assistant Examiner—Alfred Muratori
Attorney, Agent, or Firm—Edwin E. Greigg; Ronald E. Greigg

[57] ABSTRACT

A simplified and improved hydraulic brake system has at least one valve arrangement for the brake pressure modulation in a wheel brake. Furthermore, a high-pressure pump is provided to return pressure medium from the wheel brake into a main brake cylinder in the case of an anti-lock control operation or to deliver pressure medium from the main brake cylinder into a wheel brake during drive-slip control operation. A shut-off valve with a spring-actuated through-flow position and a shut-off position, which can be selected by the pressure at the main brake cylinder end, is arranged upstream on the suction side of the high-pressure pump. The hydraulic brake system with anti-lock and drive-slip control device is used in motor vehicles.

2 Claims, 1 Drawing Sheet

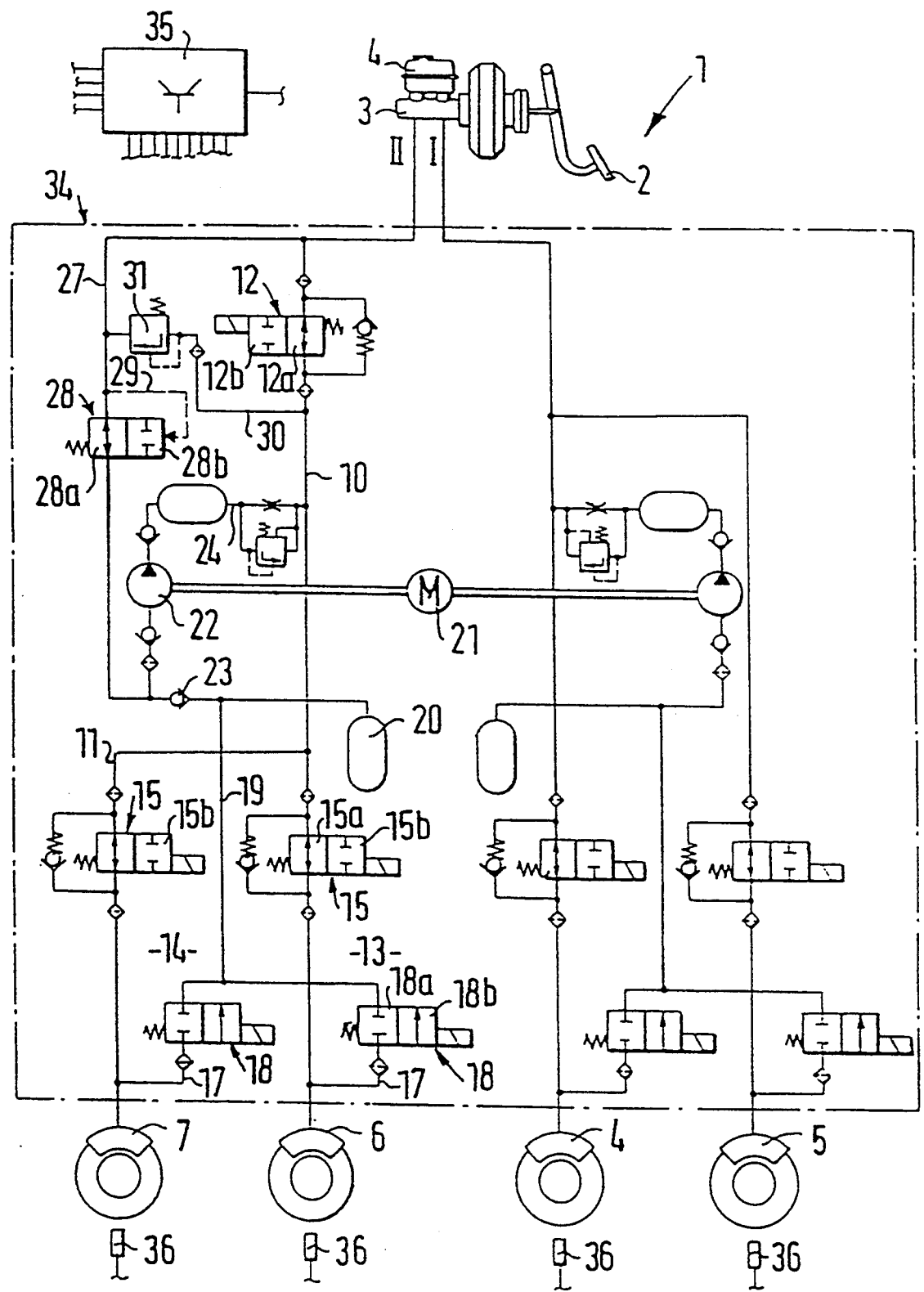

HYDRAULIC BRAKE SYSTEM WITH ANTI-LOCK AND DRIVE SLIP CONTROL DEVICE, FOR MOTOR VEHICLES

PRIOR ART

The invention is based on a hydraulic brake system with anti-lock and drive-slip control device as set forth hereinafter.

Such a brake system has already been proposed (EP-A-0 482 379) in which the shut-off valve in the induction conduit has a spring-actuated shut-off position as its basic position and a through-flow position, which can be selected electromagnetically. This shut-off valve is provided for the induction control of the high-pressure pump, i.e. the valve only releases the connection to the main brake cylinder in drive-slip control operation when the high-pressure pump is to supply a pressure medium.

Furthermore, a brake system has already been proposed (EP-A-0 464 375) in which the high-pressure pump is connected to a pressure medium storage container of the main brake cylinder by a suction conduit. A shut-off valve is arranged in the induction conduit at the suction end of the pump and this shut-off valve takes up its through-flow position under spring actuation and can be switched into its shut-off position by the main brake cylinder pressure.

ADVANTAGES OF THE INVENTION

The hydraulic brake system according to the invention has, in contrast, the advantage that the substitution of hydraulic actuation for electromagnetic actuation of control unit. Furthermore, a relatively large flow cross-section can be achieved with simple means in the case of a hydraulically actuated shut-off valve. At low temperatures, this reduces the throttling effect of the valve when inducing pressure medium from the main brake cylinder.

An advantageous further development of the brake system given herein is possible by means of the measure quoted hereinafter. A particular advantage of this is the fact that a low-pressure reservoir chamber which is partially filled after an anti-lock operation or a drive-slip control operation can be emptied automatically into the main brake cylinder via the non-return valve and the second shut-off valve, which takes up its through-flow position, after the brake pedal has been released.

DRAWING

An embodiment example of the invention is explained in more detail in the following description using a circuit diagram of a hydraulic brake system shown in the drawing.

DESCRIPTION OF THE EMBODIMENT EXAMPLE

The hydraulic brake system 1 shown in the drawing is intended for use in motor vehicles, in particular passenger cars.

The brake system 1 has a two-circuit main brake cylinder 3, which can be actuated by a brake pedal 2 and has a pressure medium storage container 4. A first brake circuit I of the brake system 1 is associated with wheel brakes 4, 5 of non-driven vehicle wheels of, for example, the front axle of the vehicle. The wheel brakes 6, 7 of driven vehicle wheels of, for example, the rear axle of the vehicle are connected to a second brake circuit II. The brake system 1 therefore has the so-called TT brake circuit distribution. The brake circuit II associated with the solution according to the invention is explained in more detail below:

The brake circuit II has a brake conduit 10 which, starting from the main brake cylinder 3, leads to the wheel brake 6. A brake conduit 11 branches off from this brake conduit 10 to the second wheel brake 7 of this brake circuit II. A first shut-off valve 12 in the form of a 2/2-way valve with a spring-actuated through-flow position 12a and a shut-off position 12b, which can be selected electromagnetically, is arranged in the brake conduit 10 at the main brake cylinder end. Valve arrangements 13, 14 for the brake pressure modulation in the wheel brakes 6, 7 are provided at the wheel brake end. Each valve arrangement 13, 14 has an inlet valve 15, which is arranged in the corresponding brake conduit 10, 11 and controls the supply of pressure medium to the wheel brake 6, 7. This inlet valve 15 is configured as a 2/2-way valve with a spring-actuated through-flow position 15a and a shut-off position 15b, which can be selected electromagnetically. A respective return conduit 16, 17 starts from the associated brake conduit 10, 11 between the respective inlet valve 15 and the wheel brakes 6, 7. An outlet valve 18 of the valve arrangements 13, 14 is arranged in each of the return conduits 17. The outlet valve 18 is likewise configured as a 2/2-way valve; it has, however, a spring-actuated shut-off position 18a and a through-flow position 18b, which can be selected electromagnetically. The return conduits 17 are combined in a return conduit 19 after the two outlet valves 18 and a low-pressure reservoir chamber 20 is connected to the return conduit 19. A non-return valve 23, with through-flow direction from the wheel brakes 6, 7 to the pump, is arranged in the return conduit 19 leading to the suction side of a high-pressure pump 22, which can be driven by an electric drive motor 21, between the connection of the reservoir chamber 20 and the high-pressure pump 22. A feed conduit 24 opening into the brake conduit 10 between the shut-off valve 12 and the valve arrangements 13, 14 starts from the pressure end of the high-pressure pump 22.

The high-pressure pump 22, which is configured to be self-priming, is also in connection on the suction side with a suction conduit 27 which starts from the brake conduit 10 between the main brake cylinder 3 and the shut-off valve 12 and opens into the return conduit 19 between the non-return valve 23 and the high-pressure pump 22. A second shut-off valve 28 in the form of a 2/2-way valve is arranged in the suction conduit 27. The second shut-off valve 28 has a spring-actuated through-flow position 28a as its basic position and a shut-off position 28b, which can be selected hydraulically. In order to produce this position, the second shut-off valve 28 is connected by a control conduit 29 to the section of the suction conduit 27 at the main brake cylinder end. Furthermore, a relief conduit 30 is also provided. This relief conduit 30 has a pressure-limiting valve 31, starts from the brake conduit 10 between the first shut-off valve 12 and the connection of the feed conduit 24 and opens into the section of the suction conduit 27 at the main brake cylinder end. The pressure which can be generated by the high-pressure pump 22 in the brake conduit 10 when the first shut-off valve 12 takes up its shut-off position 12b can be limited by this pressure-limiting valve 31.

The elements of the brake system 1 arranged between the main brake cylinder 3 and the wheel brakes 4, 5, 6, 7 are part of an anti-lock and drive-slip control device 34, which includes an electronic control unit 35 and wheel rotational speed sensors 36 associated with the individual vehicle wheels. The control unit 35 can evaluate signals from the wheel rotational speed sensors 36 and convert them into switching signals for the drive motor 21 and the various electromagnetically actuable valves of the brake system 1. Both anti-lock control operation and drive-slip control operation are possible in the brake circuit II whereas the brake circuit I, which is not explained in any more detail, only permits anti-lock control operation.

The hydraulic brake system 1 has the following functions, which are explained using the brake circuit II:

In a normal braking operation initiated by the driver, the first shut-off valve 12, the inlet valves 15 and the outlet valves 18 of the valve arrangements 13, 14 take up the position shown. Furthermore, the electric drive motor 21 is out of operation. The pressure generated in the main brake cylinder 3 by actuation of the brake pedal 2 is transmitted into the wheel brakes 6, 7 by displacing partial quantities of pressure medium through the brake conduits 10, 11. The pressure generated by the main brake cylinder 3 is also effective in the section of the suction conduit 27 at the main brake cylinder end and is effective in the control conduit 29 so that the second shut-off valve 28 is switched into its shut-off position 28b. When load is removed from the brake pedal 2, partial quantities of pressure medium flow back to the main brake cylinder 3 from the wheel brakes 6, 7. When the braking operation ends, the second shut-off valve 28 returns to its basic position, the through-flow position 28a, because of pressure relief in the suction conduit 27.

If the danger of locking occurs during such a braking operation, for example at the vehicle wheel associated with the wheel brake 6, this is recognized by the electronic control unit 35 on the basis of the signals of the wheel rotational speed sensors 36. The valve arrangement 13 is switched in phases for pressure reduction, pressure retention and pressure build-up in the wheel brake 6, in a manner known per se, in accordance with a control algorithm stored in the control unit 35. In phases for brake pressure reduction, pressure medium can drain from the wheel brake 6 through the return conduit 17, the outlet valve 18, which takes up its through-flow position 18b, of the valve arrangement 13 and the return conduit 19. The high-pressure pump 22, which is put into operation by the control unit 35, induces this pressure medium, part of which is taken from the reservoir chamber 20, and delivers it into the brake conduit 10 and back to the main brake cylinder 3. Induction of pressure medium through the induction conduit 27 is prevented because the second shut-off valve 28 takes up its shut-off position 28b.

If, when the vehicle is being driven away and accelerated, an unallowably high level of drive slip occurs at the driven vehicle wheel associated with the wheel brake 6, for example, this wheel rotational behaviour is likewise recognized by the control unit 35 on the basis of the signals of the wheel rotational speed sensors 36. In accordance with a stored control algorithm, the control unit 35 puts the high-pressure pump 22 into operation and switches the first shut-off valve 12 into the shut-off position 12b and the inlet valve 15 of the valve arrangement 14 into the shut-off position 15b. Because there is no actuation of the brake pedal 2, the second shut-off valve 28 is in its through-flow position 28a. The high-pressure pump 22 can therefore induce pressure medium from the main brake cylinder 3 through the suction conduit 27 and deliver it through the feed conduit 24 into the brake conduit 10. The brake pressure in the wheel brake 6 is now modulated, in known manner, by switching the valve arrangement 13. Pressure medium delivered by the high-pressure pump 22 but not accepted by the wheel brake 6 is spilled through the relief conduit 30 and the pressure-limiting valve 31 to the suction conduit 27. When the drive-slip control operation has ended, the high-pressure pump 22 is switched off and the valves 12, 15, 18 are returned to their initial position. The low-pressure reservoir chamber 20, which has a minimum operating pressure, expels any pressure medium it still contains during this phase so that this pressure medium can flow back automatically, overcoming the non-return valve 23, through the suction conduit 27 and the second shut-off valve 28, which takes up its through-flow position 28a, to the main brake cylinder 3. The return flow of the pressure medium is supported by the relatively large flow cross-section of the second shut-off valve 28. In addition, this reduces the throttling effect of the second shut-off valve 28, which has advantageous effects when inducing pressure medium from the main brake cylinder 3 in drive-slip control operation at low temperatures when the viscosity of the pressure medium is increased.

At certain time intervals, the electronic control unit 35 initiates a test operation of the anti-lock and drive-slip control device 34. In this, the high-pressure pump 22 is put into operation and pressure medium is induced from the main brake cylinder 3 through the suction conduit 27. The pressure medium delivered into the brake conduit 10 flows through the first shut-off valve 12, which takes up its throughflow position 12a, and is induced again by the pump 22 through the suction conduit 27 and the second shut-off valve 28, which is open. Because of the large flow cross-section of the second shut-off valve 28, the induction pressure of the high-pressure pump 22 is effective at the first shut-off valve 12 to such an extent that pressure propagation into the wheel brakes 6, 7, due to the back pressure caused by the pump at the first shut-off valve 12, is substantially avoided.

As a variant of the embodiment example described, the effects of the second shut-off valve 28 can be achieved if the latter has electromagnetic actuation of the shut-off position 28b instead of the hydraulic actuation.

The advantageous effects of the solution according to the invention can also be achieved in the case of a brake system with K brake circuit distribution. In K distribution, the wheel brakes of diagonally opposite vehicle wheels are included in one brake circuit. As an example, the wheel brakes 4, 6 can be associated with the driven front wheels of the vehicle and the wheel brakes 5, 7 can be associated with the non-driven rear wheels of the vehicle. In the case of the brake circuit II, the brake conduit 11 is then connected to the brake conduit 10 at the main brake cylinder end, for example by connection to the section of the induction conduit 27 extending between the second shut-off valve 28 and the main brake cylinder 3. In a corresponding manner, the brake circuit I has then to be equipped with a self-priming high-pressure pump 22, a first shut-off valve 12, a non-return valve 23, a second shut-off valve 28, a relief conduit 30 and a pressure-limiting valve 31.

We claim:

1. A hydraulic brake system (1) with an anti-lock and drive-slip control device (34) for motor vehicles,
   having a brake conduit (10), with a valve arrangement (13) for brake pressure modulation in a wheel brake, extending between a pedal-actuated main brake cylinder (3) and the wheel brake (6),
   a pressure medium return conduit (17, 19) from the valve arrangement (13) to a suction side of a high-pressure pump (22), which return conduit (17, 19) is connected at a pressure end to a feed conduit (24) between the main brake cylinder (3) and the valve arrangement on the brake conduit (10),
   a first shut-off valve (12) which is arranged in the brake conduit (10) between the main brake cylinder (3) and the feed conduit (24),
   a second shut-off valve (28), which has a through-flow position (28a) and a shut-off position (28b), in a suction conduit (27) which starts from the brake conduit (10) between the main brake cylinder (3) and the first shut-off valve (12) and is in connection with the suction side of the high-pressure pump (22),
   an electronic control unit (35) which switches the valves (12, 15, 18) and the pump (22) as a function of wheel rotational behavior, and
   the second shut-off valve (28), which takes up its through-flow position (28a) as its basic position, can be switched into its shut-off position by the pressure in the suction conduit (27) at the main brake cylinder end.

2. A hydraulic brake system according to claim 1, in which a low-pressure reservoir chamber (20) is connected to the return conduit (19) to accept a pressure medium extracted from the wheel brake (6) and a non-return valve (23) is in the return conduit (19) between the connection of the low-pressure reservoir chamber (20) and the pump-end connection of the suction conduit (27).

* * * * *